US009880828B2

United States Patent
Hu et al.

(10) Patent No.: US 9,880,828 B2
(45) Date of Patent: Jan. 30, 2018

(54) NOTIFICATIONS FRAMEWORK FOR DISTRIBUTED SOFTWARE UPGRADES

(71) Applicant: Oracle International Corporation, Redwood Shores, CA (US)

(72) Inventors: Fang Hu, Dublin, CA (US); Chi Kin Vong, Chandler, AZ (US); Praveena Vajja, San Francisco, CA (US); Tim Richardson, Mesa, AZ (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 14/935,254

(22) Filed: Nov. 6, 2015

(65) Prior Publication Data

US 2016/0132318 A1    May 12, 2016

Related U.S. Application Data

(60) Provisional application No. 62/076,900, filed on Nov. 7, 2014.

(51) Int. Cl.
*G06F 9/44*    (2006.01)
*G06F 9/445*    (2006.01)

(52) U.S. Cl.
CPC ...................... *G06F 8/65* (2013.01)

(58) Field of Classification Search
None
See application file for complete search history.

(56) References Cited

U.S. PATENT DOCUMENTS

| 5,862,325 | A  | * | 1/1999  | Reed .................. H04L 29/06 |
|           |    |   |         | 704/270.1 |
| 6,088,717 | A  |   | 7/2000  | Reed et al. |
| 6,314,567 | B1 |   | 11/2001 | Oberhauser et al. |
| 6,360,366 | B1 |   | 3/2002  | Heath et al. |
| 6,633,899 | B1 |   | 10/2003 | Coward |
| 6,775,830 | B1 | * | 8/2004  | Matsunami ............... G06F 8/61 |
|           |    |   |         | 717/174 |

(Continued)

OTHER PUBLICATIONS

U.S. Appl. No. 14/838,184, Non-Final Office Action dated Aug. 11, 2016, 15 pages.

(Continued)

*Primary Examiner* — Chameli Das
(74) *Attorney, Agent, or Firm* — Kilpatrick Townsend & Stockton LLP

(57) ABSTRACT

Techniques for managing an upgrade operation comprising multiple upgrade process executing on multiple host machines (or hosts) for upgrading software applications on the multiple hosts. Techniques are disclosed for managing notifications that are generated by the multiple upgrade processes during execution, and more particular, techniques for reducing the number of notifications that are sent to a user. The techniques include: only sending a subset of the generated notifications to a user, the subset being selected at the host machines based upon notifications level criteria specified by the user for the host machines; consolidating multiple generated notifications into a fewer number of consolidated notifications and only sending consolidated notifications to the user; combination of criteria-based selection and notifications consolidation.

13 Claims, 9 Drawing Sheets

(56) References Cited

U.S. PATENT DOCUMENTS

| | | | |
|---|---|---|---|
| 6,779,028 B1 | 8/2004 | Nakamura | |
| 7,191,187 B2* | 3/2007 | Takeshita | G06F 17/3089 |
| 7,457,880 B1 | 11/2008 | Kim | |
| 7,584,467 B2 | 9/2009 | Wickham et al. | |
| 7,739,677 B1 | 6/2010 | Kekre et al. | |
| 8,346,913 B2 | 1/2013 | Gao et al. | |
| 8,589,535 B2 | 11/2013 | Calder et al. | |
| 8,752,040 B2* | 6/2014 | Halliday | G06F 17/30306 717/172 |
| 9,032,053 B2 | 5/2015 | Kosuru et al. | |
| 9,185,514 B1 | 11/2015 | Reeves et al. | |
| 9,223,962 B1* | 12/2015 | Kashyap | G06F 21/566 |
| 2003/0005351 A1 | 1/2003 | Lim | |
| 2004/0003352 A1* | 1/2004 | Bargeron | G06F 17/24 715/230 |
| 2004/0010808 A1* | 1/2004 | deCarmo | H04L 51/04 725/139 |
| 2004/0012613 A1* | 1/2004 | Rast | G11B 27/105 345/632 |
| 2004/0030567 A1* | 2/2004 | Takeshita | G06F 17/3089 705/1.1 |
| 2004/0044736 A1* | 3/2004 | Austin-Lane | H04L 12/58 709/206 |
| 2004/0103411 A1 | 5/2004 | Thayer | |
| 2006/0010233 A1 | 1/2006 | Fellenstein et al. | |
| 2006/0015861 A1 | 1/2006 | Takata et al. | |
| 2006/0184937 A1* | 8/2006 | Abels | G06F 8/65 718/1 |
| 2006/0218545 A1 | 9/2006 | Taguchi | |
| 2006/0240803 A1* | 10/2006 | Valeriano | H04L 67/26 455/412.1 |
| 2008/0133741 A1 | 6/2008 | Kubota | |
| 2008/0168434 A1 | 7/2008 | Gee et al. | |
| 2008/0244555 A1 | 10/2008 | Welvaert et al. | |
| 2008/0250405 A1 | 10/2008 | Farhangi et al. | |
| 2009/0248801 A1* | 10/2009 | Then | G06Q 10/10 709/204 |
| 2010/0125849 A1 | 5/2010 | Oswald et al. | |
| 2010/0235823 A1* | 9/2010 | Garbers | G06F 8/71 717/170 |
| 2011/0289498 A1 | 11/2011 | Xie et al. | |
| 2012/0005316 A1 | 1/2012 | Perry et al. | |
| 2012/0066380 A1* | 3/2012 | Gao | G06F 17/3089 709/224 |
| 2012/0204171 A1* | 8/2012 | Reisman | G06F 8/65 717/172 |
| 2013/0174178 A1 | 7/2013 | Chakraborty et al. | |
| 2013/0263104 A1* | 10/2013 | Baset | G06F 8/68 717/168 |
| 2013/0291099 A1* | 10/2013 | Donfried | G06Q 30/0637 726/22 |
| 2013/0346922 A1* | 12/2013 | Shiplacoff | G06F 3/04842 715/835 |
| 2014/0096076 A1* | 4/2014 | Ashbrook | G06F 3/0481 715/808 |
| 2014/0189030 A1* | 7/2014 | Benchenaa | H04L 51/24 709/207 |
| 2014/0298196 A1* | 10/2014 | Aoyama | H04L 51/24 715/752 |
| 2014/0304714 A1* | 10/2014 | Shapiro | G06F 9/542 719/318 |
| 2014/0317522 A1* | 10/2014 | Lucero | G06F 3/01 715/744 |
| 2015/0067819 A1 | 3/2015 | Shribman et al. | |
| 2015/0178066 A1 | 6/2015 | Horn et al. | |
| 2015/0193222 A1 | 7/2015 | Pirzadeh et al. | |
| 2015/0360239 A1 | 12/2015 | Yano et al. | |
| 2016/0028667 A1* | 1/2016 | Faaborg | H04L 51/32 709/206 |
| 2016/0066145 A1* | 3/2016 | Pietraniec | H04W 4/021 455/456.3 |
| 2016/0070558 A1 | 3/2016 | Hu et al. | |
| 2016/0092310 A1 | 3/2016 | Peacock et al. | |
| 2016/0124741 A1 | 5/2016 | Hu et al. | |
| 2016/0132316 A1 | 5/2016 | Hu et al. | |
| 2017/0099592 A1* | 4/2017 | Loeb | H04W 4/18 |

OTHER PUBLICATIONS

What is Prevayler?, Prevayler, Version 2.6, http://prevayler.org/, Jan. 15, 2013, 1 page.

U.S. Appl. No. 14/925,354, Non-Final Office Action dated Oct. 20, 2016, 12 pages.

U.S. Appl. No. 14/935,112, Non-Final Office Action dated Oct. 25, 2016, 11 pages.

Dumitras et al., Why Do Upgrades Fail and What Can We Do about It? Toward Dependable, Online Upgrades in Enterprise System, IFIP International Federation for Information Processing, 2009, pp. 349-372.

Greene, SCOM 2012—Configuring Application Performance Monitoring (APM) Part 3, IT Blog, http:/lkevingreeneitblog.blogspot.com/2012/03/scom-2012-configuring-application_49.html, Mar. 2012, 9 pages.

Microsoft, Orchestration Suspended Instances Availability Monitor Monitor, http://mpwiki.viacode.com/default.aspx?g=posts&t=164367, Oct. 2013, 2 pages.

Vancauwenberghe, Monitoring suspended orchestrations using System Center Operations Manager, Codit Blog, Feb. 14, 2014, 8 pages.

U.S. Appl. No. 14/925,354, Notice of Allowance dated Apr. 12, 2017, 8 pages.

U.S. Appl. No. 14/935,112, Notice of Allowance dated May 1, 2017, 15 pages.

U.S. Appl. No. 14/838,184, Final Office Action dated Feb. 14, 2017, 17 pages.

U.S. Appl. No. 14/838,184, "Notice of Allowance", dated Jun. 8, 2017, 10 pages.

* cited by examiner

NOTIFICATIONS FRAMEWORK FOR DISTRIBUTED SOFTWARE UPGRADES

CROSS-REFERENCES TO RELATED APPLICATIONS

This Application is a non-provisional of and claims the benefit of and priority to U.S. Provisional Application No. 62/076,900, filed Nov. 7, 2014 and entitled "NOTIFICATIONS FRAMEWORK FOR DISTRIBUTED SOFTWARE UPGRADES," the entire contents of which are incorporated herein by reference for all purposes.

BACKGROUND

The term upgrading a software application generally refers to the process of replacing an existing version of the software application with a newer version, adding a new version of the software application where none previously existed, or somehow changing an existing version of the software application to a newer different version. A software upgrade may be performed for various reasons such as to add one or more features, remove one or more features, modify one or more features from an existing version of the software, remove bugs or errors, improve the software efficiency, and other reasons. An upgrade is generally performed to enhance the performance of a software application.

Many modern computing environments typically include a framework of multiple heterogeneous software applications, which may be developed by different third-party entities. These software applications may include zero or more plugins. The plugins may, for example, include software components that add a new utility/feature or enhance the utilities/features of a software application. The applications may run on or be hosted by multiple hosts in a distributed environment, with each host potentially hosting multiple applications. Performing an upgrade operation in such a distributed environment comprises multiple upgrade processes executed by multiple hosts such that one or more upgrade processes may be executed to upgrade each application. Many of the upgrade processes may be executed in parallel. Possible dependencies among the upgrade processes further complicate the overall upgrade.

In an environment where multiple applications hosted by multiple hosts need to be upgraded, the upgrade operation can comprise several upgrade processes running, possibly in parallel, on multiple hosts. Each upgrade process may be configured to generate and send out a message or notification indicative of the progress of the process. These notifications may, for example, be provided in the form of emails that are sent to one or more users such as system administrators and the like. Since a single host may execute multiple upgrade processes, possibly in parallel, with each upgrade process generating one or more notifications, a host may generate and send out multiple such notifications. Since there could be multiple hosts (e.g., thousands of hosts) involved in the upgrade operation with each host executing one or more upgrade processes, a large number of notifications may be generated as part of the overall upgrade operation. Significant processing and memory resources are used, and many times wasted, in the generation and delivery of these large numbers of notifications. Moreover, the users receiving these notifications are completely overwhelmed by the volume of such notifications.

Conventionally, individual user recipients have tried to address this problem by building their own filtering applications to reduce notifications received by that specific recipient. However, these filtering applications are user-specific and execute on the user-side (on the user's client devices) and thus fail to reduce the overall notifications-related network traffic generated by the hosts executing the upgrade processes.

BRIEF SUMMARY

The present disclosure relates generally to managing an overall upgrade operation comprising multiple upgrade process executing on multiple host machines (or hosts) for upgrading software applications on the multiple hosts. In certain embodiments, techniques are disclosed for managing notifications that are generated by the multiple upgrade processes during execution. For example, an upgrade process may generate one or more notifications indicating the progress of the upgrade process when the notification is generated. The techniques reduce the number of notifications that are sent to a user. As a result, compared to conventional techniques, the number of network, processing, and memory resources needed for processing of the notifications, both on the host machines side and also on the client devices of users that receive the notifications, are dramatically reduced.

In certain embodiments, according to one technique, instead of sending all the notifications generated by the upgrade processes to a user, only a subset of the generated notifications are sent to a user, the subset selected at the host machines based upon notifications level criteria specified by the user for the host machines. In one embodiment, for a notification generated by an upgrade process executing on a host machine, a level associated with the generated notification is determined and compared to a user-specified notification level for that host machine. A determination is then made whether or not to send the notification to the user based upon the comparison. The notification is sent to the user only if the comparison indicates that the notification is to be sent to the user, else the notification is not sent to the user and filtered out.

In certain embodiments, according to another technique, multiple notifications generated by the upgrade processes may be consolidated into a few number of consolidated notifications (i.e., fewer than the number of multiple notifications generated by the upgrade process), and the consolidated notifications sent to a user instead of the multiple generated notifications. For example, multiple notifications may be consolidated into a single consolidated notification, which is then sent to the user instead of the multiple notifications.

In certain embodiments, combinations of the filtering and consolidation techniques may be used to reduce the number of notifications that are communicated to users. As notifications are generated by the upgrade processes executing on a host, the level of each generated notification is compared to the level(s) specified in the configuration file configured for that host. The comparison determines whether that notification is to be communicated to a recipient or is not to be communicated (i.e., is to be filtered out). In this manner, a notification filtering system is implemented on a host that only communicates notifications with a certain level(s) to one or more recipients and does not communicate the other notifications that are filtered out. A recipient could a user, such as a system administrator, or a notification agent, or the like. In some embodiments, one of the hosts may be assigned as the notification agent. Alternatively, the upgrade system may include a dedicated notification agent.

In certain embodiments, techniques (including methods, systems, code or software instructions executed by one or more processors) are provided for generating, by an upgrade process executing on a host machine for upgrading a software application on the host machine, a notification comprising information related to the upgrade process. The host machine determines a notification level associated with the notification. The host machine determines, based upon the notification level associated with the notification and a user-specified notification level configured for the host machine, whether the notification is to be sent to a user. Determining whether the notification is to be sent to the user comprises comparing the notification level associated with the notification to the user-specified notification level, and determining that the notification is to be sent to the user if the notification level associated with the notification matches the user-specified notification level. Determining whether the notification is to be sent to the user comprises comparing the notification level associated with the notification to the user-specified notification level, and determining that the notification is to be sent to the user if the notification level associated with the notification matches or is higher than the user-specified notification level. The host machines send the notification to the user upon determining that the notification is to be sent to the user. The host machine does not send the notification to the user upon determining that the notification is to not be sent to the user. The host machine stores a configuration file, the configuration file storing the user-specified notification level. The notification comprises information indicating an upgrade progress status of the upgrade process. The notification is sent to a notification agent to be consolidated with additional notifications prior to being sent to the user.

In certain embodiments, techniques (including methods, systems, code or software instructions executed by one or more processors) are provided for receiving, by a third host machine from a group of host machines, a first notification generated by a first upgrade process executing on a first host machine for upgrading a first software application on the first host machine. The first notification comprises information related to the first upgrade process. The first host machine is included in the group of host machine. The third host machine receives a second notification generated by a second upgrade process executing on a second host machine for upgrading a second software application on the second host machine. The second notification comprises information related to the second upgrade process. The second host machine included in the group of host machines. The third host machine consolidates the first notification and the second notification into a consolidated notification. The third host machine determines whether the consolidated notification is to be sent to a user. The third host machine sends the consolidated notification to the user, instead of the first notification and the second notification, upon determining that the consolidated notification is to be sent to the user. The third host machine does not send the consolidated notification to the user upon determining that the consolidated notification is not to be sent to the user. A third notification may be generated by a third upgrade process executing on the third host machine for upgrading a third software application on the third host machine. The third notification comprises information related to the third upgrade process. The third host machine included in the group of host machines. The third host machine consolidates the third notification with the first notification and the second notification into the consolidated notification.

In some embodiments, determining whether the consolidated notification is to be sent to the user further comprises the third host machine determines a notification level associated with the consolidated notification. The third host machine determines based upon the notification level associated with the consolidated notification and a user-specified notification level configured for the group of host machines, whether the notification is to be sent to the user.

According to some embodiments, the third host machine compares the notification level associated with the consolidated notification to the user-specified notification level, and determines that the consolidated notification is to be sent to the user if the notification level associated with the consolidated notification matches the user-specified notification level. In some embodiments, the third host machine compares the notification level associated with the consolidated notification to the user-specified notification level, and determines that the consolidated notification is to be sent to the user if the notification level associated with the consolidated notification matches or is higher than the user-specified notification level.

In some embodiments, the first host machine determines a first notification level associated with the first notification, and compares the first notification level associated with the first notification to a first user-specified notification level configured for the first host machine. The first host machine then determines that the first notification is to be sent to the third host machine based on the comparing. Yet in other embodiments, the third host machine determines a first notification level associated with the first notification and a second notification level associated with the second notification. The third host machine compares the first notification level and the second notification level to a user-specified notification level configured for the group of host machines, and determines that the first notification and the second notification are to be consolidated based on the comparing.

In certain embodiments, techniques (including methods, systems, code or software instructions executed by one or more processors) are provided for generating, by an upgrade process executing on a host machine for upgrading a software application on the host machine, a notification comprising information related to the upgrade process. The host machine is provided in a group of host machines. The host machine determines a notification level associated with the notification. The host machine stores a configuration file, the configuration file storing a user-specified notification level for the host machine, and a group configuration file, the group configuration file storing a user-specified group notification level for the group of host machines. The host machine determines, based upon the notification level associated with the notification, the user-specified notification level, and the user-specified group notification level, whether the notification is to be sent to a user. The host machine sends the notification to the user upon determining that the notification is to be sent to the user. The host machine does not send the notification to the user upon determining that the notification is to not be sent to the user. The notification comprises information indicating an upgrade progress status of the upgrade process. The notification is sent to a notification agent to be consolidated with additional notifications prior to being sent to the user.

In some embodiments, the determining whether the notification is to be sent to the user further comprises comparing, by the host machine, the notification level associated with the notification to the user-specified group notification level and the user-specified notification level. The user-specified group notification level trumps the user-specified notification level for the notification. The host machine determines that the notification is to be sent to the user if the notification level associated with the notification matches the user-specified group notification level. In other embodiments, the host machine determines that the notification is to be sent to the user if the notification level associated with the notification matches or is higher the user-specified group notification level.

In some embodiments, the determining whether the notification is to be sent to the user further comprises comparing, by the host machine, the notification level associated with the notification to the user-specified group notification level and the user-specified notification level. The user-specified notification level trumps the user-specified group notification level for the notification. The host machine determines that the notification is to be sent to the user if the notification level associated with the notification matches the user-specified notification level. In other embodiments, the host machine determines that the notification is to be sent to the user if the notification level associated with the notification matches or is higher the user-specified notification level.

These and other embodiments are described in further detail below.

BRIEF DESCRIPTION OF THE DRAWINGS

Illustrative embodiments of the present invention are described in detail below with reference to the following drawing figures.

DETAILED DESCRIPTION

Figure 1:
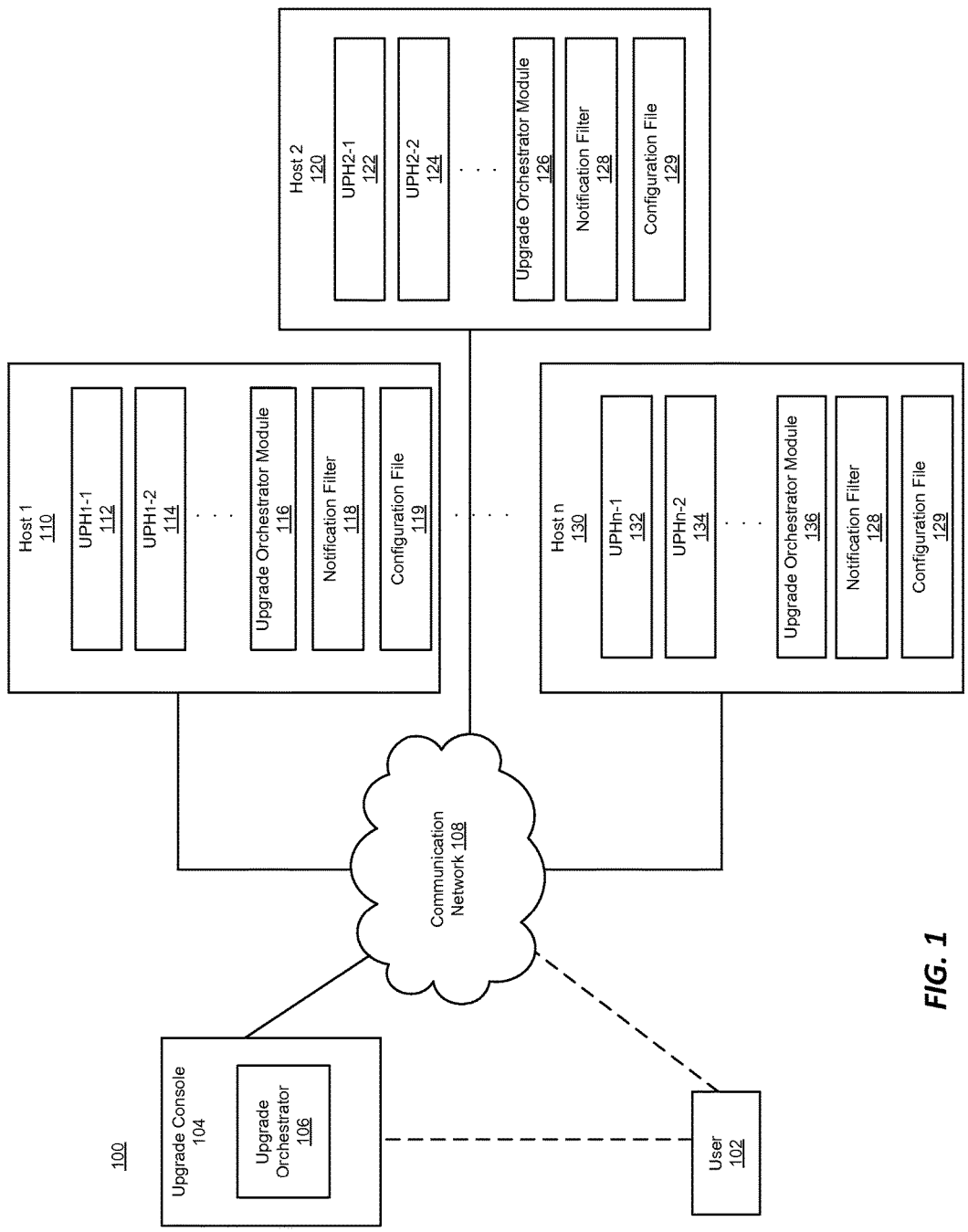
FIG. 1 depicts an upgrade infrastructure for executing multiple upgrade processes on multiple hosts according to an embodiment of the present invention.

In the following description, for the purposes of explanation, specific details are set forth in order to provide a thorough understanding of embodiments of the invention. However, it will be apparent that various embodiments may be practiced without these specific details. The figures and description are not intended to be restrictive.

Systems depicted in some of the figures may be provided in various configurations. In some embodiments, the systems may be configured as a distributed system where one or more components of the system are distributed across one or more networks.

The present disclosure relates generally to managing an overall upgrade operation comprising multiple upgrade process executing on multiple host machines (or hosts) for upgrading software applications on the multiple hosts. The software applications hosted by the hosts may be developed by different third-party entities. Due to the heterogeneity of the software applications and further coupled with the distributed nature of the computing environment, the process of upgrading such applications is quite complicated. The upgrade is performed by running one or multiple software upgrades on the various hosts for upgrading the various pieces of software applications hosted by the hosts. The complexity of performing such a distributed upgrade is impacted by several factors such as the number of applications that need to be upgraded, the distributed nature of the applications, potential upgrade dependencies between upgrade processes for the applications hosted by the same or different hosts, customized upgrade requirements for individual applications, the number of hosts involved in the upgrade, and other factor.

An upgrade infrastructure, as described herein, enables software upgrades to be performed in a heterogeneous and distributed computing environment in an automated and efficient manner. The upgrade infrastructure enables two or more upgrade processes hosted by the same host or hosted by multiple different hosts to synchronize and coordinate their upgrade activities in an automated manner. In certain embodiments, the upgrade infrastructure provides multi-level consolidated notifications to inform users of the upgrade progress status. Each upgrade process may generate notifications. The hosts may associate levels with the generated notifications according to a pre-determined criteria. The levels may correspond to different severity or importance levels in a notification hierarchy.

In certain embodiments, techniques are disclosed for managing notifications that are generated by the multiple upgrade processes during execution. For example, an upgrade process may generate one or more notifications indicating the progress of the upgrade process when the notification is generated. The techniques reduce the number of notifications that are sent to a user. As a result, compared to conventional techniques, the number of network, processing, and memory resources needed for processing of the notifications, both on the host machines side and also on the client devices of users that receive the notifications, are dramatically reduced.

In certain embodiments, according to one technique, instead of sending all the notifications generated by the upgrade processes to a user, only a subset of the generated notifications are sent to a user, the subset selected at the host machines based upon notifications level criteria specified by the user for the host machines. In one embodiment, for a notification generated by an upgrade process executing on a host machine, a level associated with the generated notification is determined and compared to a user-specified notification level for that host machine. A determination is then made whether or not to send the notification to the user based upon the comparison. The notification is sent to the user only is the comparison indicates that the notification is to be sent to the user, else the notification is not sent to the user and filtered out.

In certain embodiments, according to another technique, multiple notifications generated by the upgrade processes may be consolidated into a few number of consolidated notifications (i.e., fewer than the number of multiple notifications generated by the upgrade process), and the consolidated notifications sent to a user instead of the multiple generated notifications. For example, multiple notifications may be consolidated into a single consolidated notification, which is then sent to the user instead of the multiple notifications.

In certain embodiments, combinations of the filtering and consolidation techniques may be used to reduce the number of notifications that are communicated to users.

FIG. 1 illustrates an exemplary upgrade infrastructure (e.g. upgrade system) 100 according to various embodiments. The upgrade infrastructure 100 includes multiple hosts 110, 120, 130. The hosts 110, 120, 130 may host multiple software applications. When these software applications are to be upgraded, multiple upgrade processes 112, 114, 122, 124, 132, 134 may be executed by the hosts 110, 120, 130 to upgrade the software applications hosted by the hosts 110, 120, 130.

In the embodiment depicted in FIG. 1, the upgrade infrastructure 100 includes an upgrade console 104 in communication with the hosts 110, 120, 130 through a communication network 108. The upgrade console 104 may be a computing system that a user 102 (e.g. a system administrator) may interact with to initiate and control the overall upgrade on the hosts 110, 120, 130. The upgrade console 104 may include an upgrade orchestrator 106 for initiating, coordinating and synchronizing the upgrade processes 112, 114, 122, 124, 132, 134 hosted by the hosts 110, 120, 130. Status information related to the overall upgrade may be output to the user via upgrade console 104.

Various embodiments may enable the user 102 to directly interact with the hosts 110, 120, 130 through the communication network 108 to initiate and control the overall upgrade on the hosts 110, 120, 130. In such embodiments, the user 102 may not use the upgrade console 104 to interact with the hosts 110, 120, 130.

In certain embodiments, the upgrade may be performed in phases. During each phase, multiple upgrade processes (i.e. tasks) may be hosted by the hosts 110, 120, 130. The upgrade orchestrator 106 may ensure that a current set of upgrade processes run to successful completion on all hosts before proceeding with the next set of upgrade processes. One of ordinary skill in the art will appreciate that the upgrade infrastructure 100 may include any number of components, hosts and upgrade processes. Thus, the upgrade infrastructure 100 is not limited to the components, hosts and upgrade processes illustrated in FIG. 1.

As illustrated in FIG. 1, multiple upgrade processes may be hosted by each one of the hosts 110, 120, 130. For example, upgrade processes 112, 114 may be hosted by on host 110, upgrade processes 122, 124 may be hosted by on host 120 and upgrade processes 132, 134 may be hosted by on host 130. Two or more of the upgrade processes 112, 114, 122, 124, 132, 134 may run in parallel. In various embodiments, the upgrade processes 112, 114, 122, 124, 132, 134 may be serialized. The upgrade orchestrator 106 may synchronize two or more of the upgrade processes 112, 114, 122, 124, 132, 134 using a dedicated upgrade orchestrator module 116, 126, 136 executed on each host 110, 120, 130, respectively. Each upgrade orchestrator module 116, 126, 136 may be a piece of code be hosted by the host 110, 120, 130 for performing the upgrade activities. The upgrade orchestrator modules 116, 126, 136 may initiate and control the upgrade processes 112, 114, 122, 124, 132, 134 executed on the hosts 110, 120, 130. The upgrade orchestrator modules 116, 126, 136 may receive and/or respond to commands and instructions from the upgrade console 104 to facilitate the upgrade on the hosts 110, 120, 130.

The upgrade processes 112, 114, 122, 124, 132, 134 executed on the hosts 110, 120, 130 may generate notifications. A notification generated by an upgrade process may include information related to the status of the upgrade process when the notification is generated. An upgrade process may generate one or more notifications, potentially at different time points during its execution on a host. For example, a notification generated by upgrade process 112 may include information indicative of a status of upgrade process 112, a notification generated by upgrade process 114 may include information indicative of a status of upgrade process 114, and so on. Upgrade process 112 may generate notifications at different time points during its execution, with a notification generated at a particular time point including information about the status of up 112 at that time point.

According to certain embodiments, the notifications generated by the upgrade processes are associated with levels (e.g., severity or importance levels) according to a predetermined criteria. For example, the notifications may be associated with an indicator (e.g., a flag, a text field) indicating the level associated with the notification. For example, in one embodiment, three notification levels may be predefined: an INFO level, an ALERT level, and a PAUSEPOINT level. Each generated notification may be associated with one of these three levels by associating a flag or a text field with the notification indicating the specific level. For example, the notifications associated with the INFO level may include status change notifications generated by one or more of the upgrade processes 112, 114, 122, 124, 132, 134. The notifications associated with the ALERT level may include upgrade failure notifications generated by one or more of the upgrade processes 112, 114, 122, 124, 132, 134. The notifications associated with the PAUSEPOINT level may indicate that one or more of the upgrade processes 112, 114, 122, 124, 132, 134 are paused.

In certain embodiments, two or more of the levels may be organized in a hierarchy or ordering (e.g. a severity or an importance hierarchy). For example, a hierarchy may be defined for the PAUSEPOINT, ALERT, and INFO levels discussed above such that PAUSEPOINT corresponds to a higher hierarchical level than the ALERT level, and the ALERT level corresponds to a higher hierarchical level than the INFO level. As discussed below, the hierarchical relationships between the levels may influence the notifications that are sent to the users.

A user 102 in communication with the hosts 110, 120, 130 may define, either through direct interaction with the hosts 110, 120, 130 or through the communication network 108, one or more configuration files 119, 129, 139 for the hosts 110, 120, 130. The configuration files 119, 129, 139 may enable the user 102 to indicate the user's preference to receive notifications corresponding to a given level. For example, the user 102 may wish to receive notifications associated with a particular level (or levels), e.g. the ALERT level. In some embodiments, configuration file may be defined at a host-level, and include user preferences for multiple users. For example, configuration file 119, 129 or 139 may include notification preferences of two or more users. A first user (e.g., user_1) may be an upgrade administrator and may wish to receive ALERT level notifications (e.g., notifications for critical events such as a patching failure). A second user (e.g., user_2) may wish to receive all notifications generated by the host. The user preference for user_1 and user_2 may be stored in the same configuration file, (e.g., the configuration file for the host).

The notification filters 118, 128, 138 may use the configuration files 119, 129, 139 to filter out any notifications that are not associated with the user-specified level. Any notifications associated with levels that do not match the user-specified level (in the configuration file) are not communicated to that user, resulting in those notifications being filtered out for that particular user. The hosts 110, 120, 130 may send the remaining notifications (i.e. notifications associated with the user-specified level) to the user 102.

As described above, in certain embodiments, the different notification levels may be hierarchically related to each other. The user 102 may specify such a hierarchical level for a host and information indicative of the hierarchical level may be stored in the configuration file for that host. In one such embodiment, when the user 102 specified a level for receiving notifications, the upgrade infrastructure 100 may not only enable notifications matching the user-specified level to be communicated to the user 102 but also allow notifications at higher hierarchical levels (e.g. more severe or more important notifications) than the user-specified hierarchical level to be sent to the user 102 as well. In such an embodiment, the user-specified hierarchical level may be considered a lower bound for notifications to be sent to the user.

For example, in an embodiment where the PAUSEPOINT, ALERT, and INFO levels are hierarchically related, with PAUSEPOINT being higher (or more severe/important) than ALERT, and ALERT being higher (or more sever/important) that INFO, if the user 102 indicates for a host that the user 102 wishes to receive notifications associated with the ALERT level, the hosts may send notifications associated with the PAUSEPOINT level (e.g. a higher hierarchical level than the ALERT level) along with the notifications associated with the ALERT level to the user. In this exemplary embodiment, the notification filters 118, 128, 138 may filter out notifications associated with the INFO level (e.g. a lower hierarchical level than the ALERT level). Accordingly, the user 102 may receive notifications that indicate an upgrade failure (e.g. notifications associated with the ALERT level) or notifications that indicate paused upgrade processes (e.g. notifications associated with the PAUSEPOINT level). The user 102 will not receive the less important notifications that indicate, for example, mere status changes (e.g. notifications associated with the INFO level).

According to various embodiments, different configuration files 119, 129, 139 may be defined for different types of hosts 110, 120, 130. The level (or levels) of interest specified by a user for one host may be different from the level (or levels) specified by the same user for a different host. Various different factors may influence the level (or levels) that the user specifies as of interest for a particular host, including but restricted to, the one or more applications hosted by the host, the configuration of the host (e.g., networking, processing (e.g., number of processors, speed of the processors, etc.), and memory resources (e.g., system memory (e.g., RAM) resources of the host)), and the like. For example, the user 102 may choose to receive only the notifications associated with a first specified level from host 110 while the user 102 may choose to receive notifications associated with a second level from host 120, where the second level is different from the first level. The configuration files 119 and 129 may be set up accordingly.

In certain embodiments, one or more hosts may be grouped together. An exemplary group of hosts may be a pod. The term pod, as used herein, defines a modular set of resources including, for example, a specific set of infrastructure, middleware, and/or application resources. A pod may comprise one or more hosts. In certain embodiments, in a group of hosts comprising multiple hosts, notifications generated by different hosts within the group may be combined or consolidated into a fewer number of notifications. The notification consolidation within a pod (e.g., an exemplary group of hosts) is discussed below with respect to FIG. 2. In general, consolidation of notifications can be performed in any environment where multiple hosts are logically grouped together and is not limited to pod environments.

Figure 2:
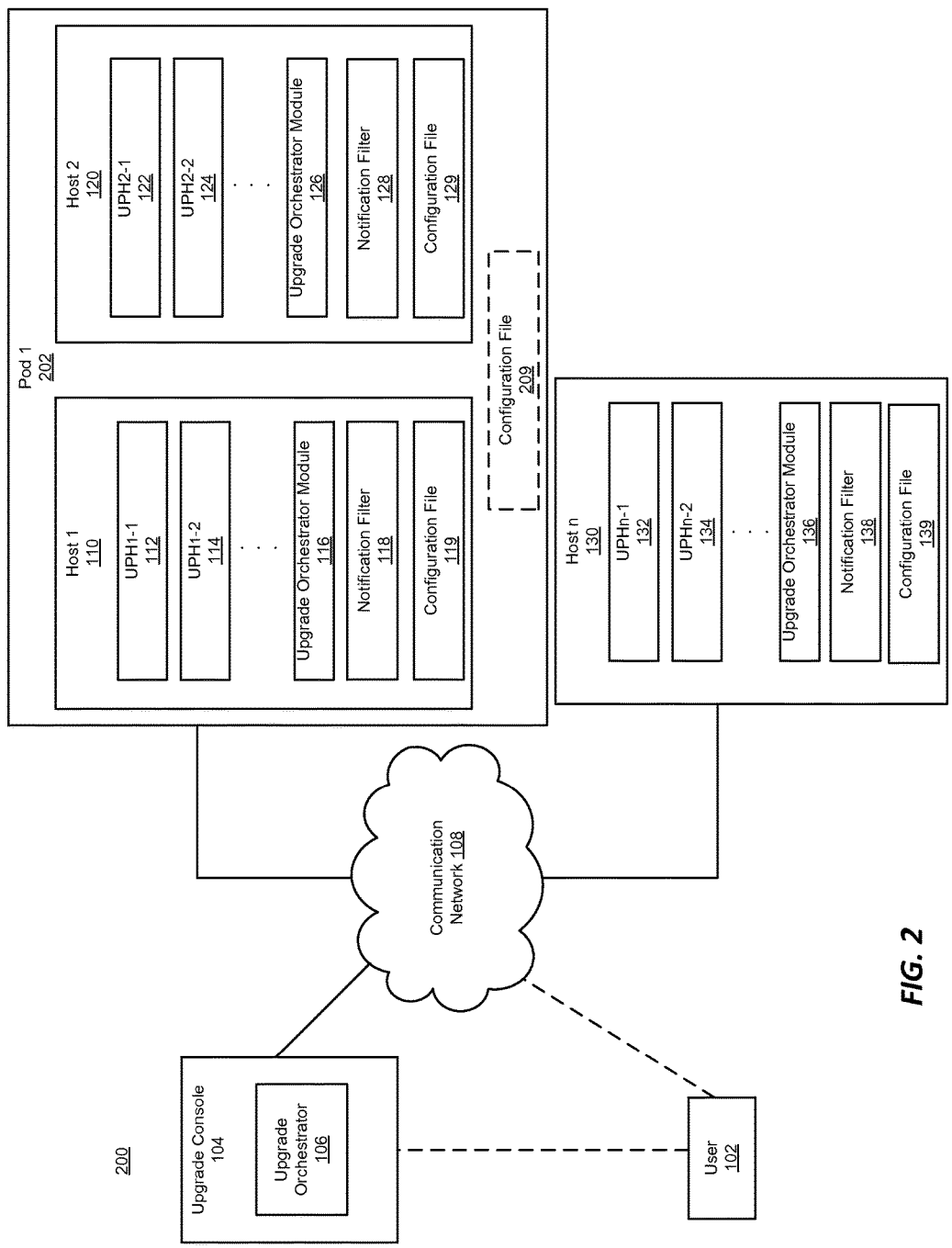
FIG. 2 depicts an upgrade infrastructure including multiple hosts grouped into a pod for executing multiple upgrade processes according to an embodiment of the present invention.

FIG. 2 illustrates an exemplary upgrade infrastructure (e.g. upgrade system) 200 according to various embodiments. The upgrade infrastructure 200 includes similar elements to the upgrade infrastructure 100 illustrated in FIG. 1. The reference numerals for these elements are kept the same and a discussion of these elements is provided above. Accordingly, the discussion of the similar elements is omitted here.

As illustrated in FIG. 2, the upgrade infrastructure 200 includes multiple hosts 110, 120, 130. In the embodiment depicted in FIG. 2, hosts 110 and 120 are grouped together to form a pod 202. This is not meant to be restrictive. In alternative embodiments, a pod may comprise various other combinations and numbers of hosts. Further, while only one pod 202 is depicted in FIG. 2, in alternative embodiments, the upgrade infrastructure 200 may include additional pods formed by grouping two or more hosts together. The upgrade infrastructure 200 may also include one or more hosts (e.g. host 130) that are not part of a pod. In this manner, upgrade infrastructure 200 may comprise some groupings of hosts and other non-grouped hosts.

As described above for FIG. 1, a user 102 may define one or more configuration files 119, 129, and 139 for the individual hosts 110, 120, and 139, respectively to specify notifications that are of interest to the user 102. Additionally, the user 102 may specify a configuration file 209 for pod 202. Configuration file 209 specifies the notification level(s) of interest to the user at the pod level. For example, the user 102 may choose to receive only notifications associated with a particular level from all hosts in the pod 202. Accordingly, the user 102 may define the pod-level configuration file 209 to store information indicative of this particular level. By configuring a configuration file at the pod level, only the notifications associated with that particular level (or higher in the case of an hierarchical level) will be sent from all hosts 110, 120 within the pod 202.

The configuration file for a pod level is independent from the configuration files specified for the individual hosts within that pod. In some embodiments, if a configuration file is defined at the pod level, the user may not even define configuration files for one or more individual hosts included in that pod. For example, in the embodiment depicted in FIG. 2, the user 102 may not define the host-level configuration files 119 and 129 for hosts 110 and 120 respectively.

As described above, in some embodiments, in addition to the pod-level configuration file that identifies a user's specified notification alert level(s) for the pod, a configuration file may be defined for one or more hosts within that pod. In such a scenario, for a host for which a host-specific configuration file is defined, the level specified in the host-specific configuration overrides the level specified in the pod-level configuration file. For example, the user 102 may choose to specify the ALERT level as the level of interest for the user for all hosts in the pod 202 except a selected subset of hosts, e.g. Internet Download Manager (IDM) hosts. That is, even within a pod, the user can specify different notification levels for different groups of hosts within the pod. The user 102 may prefer to receive all notifications (as opposed to just the notifications associated with the user-specified ALERT level) from the selected subset of hosts, e.g. the IDM hosts, in order to have a close watch on the upgrade progress running on these hosts. If host 120 illustrated in FIG. 2 is an IDM host, the user may define the host-level configuration file 129 such that all notifications from host 120 will be sent to the user 102. In this exemplary configuration, host 120 may send all notifications to user 102 while host 110 may only send the notifications associated with the user-specified ALERT level.

In certain embodiments, upgrade processes 112, 114, 122, 124 to be executed on different hosts 110, 120 within a pod 202 may be started at approximately the same time. Each upgrade process may be configured to generate a starting notification upon starting execution. Accordingly, if there are 20 hosts in a pod, 20 starting notifications may be sent to the user at approximately the same time. Moreover, every time an upgrade process restarts, the starting notification for the host executing the upgrade process may be resent. For an upgrade operation running on a large number of hosts (e.g., thousands of hosts) a very large number (e.g., tens of thousands) of notifications (e.g., email notifications) may be sent just for start, restart, etc. In certain embodiments, the upgrade infrastructure 200 addresses this problem by consolidating notifications from multiple hosts resulting in a fewer notifications. Thus, instead of having each host send notifications individually, the upgrade infrastructure 200 may consolidate notifications into fewer notifications. In certain embodiments, the multiple notifications across multiple hosts may be consolidated into one notification.

For purposes of explanation, it is assumed that consolidation is to be performed for hosts within pod 202. In such an embodiment, one of the hosts within the pod may be identified as a notification agent for the hosts within the pod and only the notification agent is configured to send out notifications for that pod. In one embodiment, the upgrade orchestrator 106 may identify one of the hosts in a pod as the notification agent. In alternative embodiments, a dedicated notification agent may be provided as part of upgrade infrastructure 100. For example, upgrade orchestrator 106 may select the host 110 as the notification agent for the pod 202. Accordingly, only the host 110 may send notifications for the pod 202.

According to various embodiments, a notification agent may send the notifications in separate threads to prevent the notifications from blocking the process of the overall upgrade. The notification agent may send the notifications in multiple threads where each thread requires less processing resources for transmitting the tread when compared to the processing resources required for transmitting a single large thread including all notifications. Assigning a host as the notification agent may be a static assignment (i.e. one host is selected to be a notification agent throughout the execution of the upgrade processes) or a dynamic assignment (i.e. different hosts become the notification agent throughout the execution of the upgrade processes).

In certain embodiments, the selection of the notification agent from among a group of hosts may depend on the types of notifications generated by the hosts. For example, a host may be selected as the notification agent based on the host's ability to send start notifications (i.e. notifications indicating that the upgrade processes be hosted by the host have started execution). Which host operates as the notification agent for sending start notifications may not be a static (i.e. fixed) agent due to the fact that any single host may not always run or may not always start before other hosts. Accordingly, which host operates as the notification agent for sending the start notifications may be dynamic and thus, may vary over a period of time. For example, the upgrade orchestrator 106 may chose a first host from multiple hosts that is the earliest one to start starts an upgrade progress as the notification agent to send start notifications.

In some embodiments, the selected host may wait for other hosts to start executing upgrade processes and consolidate the start notifications from all other hosts into a single start notification. The start notifications generated by the upgrade processes starting execution on the multiple hosts are all routed to the host that is the notification agent. The notification agent host may then consolidate the multiple start notifications received from the other hosts and also start notifications generated by upgrade processes executed on the notification agent host into a smaller number of notifications. For example, the multiple start notifications may be consolidated into a single stated notification that indicates that multiple upgrade processes on the multiple hosts of a given pod have started successfully. In some embodiments, the notification agent may discard restart notifications from any hosts within the pod.

In some embodiments, in order to allow multiple upgrade processes to generate start notifications and for the notification agent host to receive these start notifications, the consolidated start notification may be sent by the notification agent after a predefined delay after the time the notification agent host was started successfully. The predefined delay may be configurable using a property in the configuration file 209 and may be configured such that reasonable latency is allowed for hosts starting in a batch and sufficient time is allowed for the notification agent host to receive start notifications from these multiple hosts. For example, the predefined delay may be configurable using EMAIL_STARTNOTIFICATION_DELAY defined in pod.properties configuration file. For example, EMAIL_STARTNOTIFICATION_DELAY=120, may indicate that the start notification will be sent 120 seconds after the time the notification agent host (e.g., the first host) was started successfully.

In certain embodiments, the upgrade infrastructure may provide an application programming interface (API) for the users to send customized notifications without the need to code mail transport details. The supported transports may include simple message transfer protocol (SMTP) message transfer agent (MTA), mail submission agent (MSA) and authenticated MSA connections. The supported transports may be run on all platforms. The overall upgrade operation and the user may be in different platforms with different infrastructures including different operating systems, using different e-mail relays, protocols, ports, etc. For all the platforms, the API may set secured or non-secured connections to the e-mail relay including detecting the connection port, protocol, authentication, etc. and find recipients defined in the configuration file. The API may prepare the notification message by uploading/attaching any given attachments to the notification message, format the notification message, and send the notification message to the e-mail relay. The API may also retry in case of failure. The built-in API significantly reduces the development effort by individual developers by hiding the mail transport details.

The techniques discussed herein significantly reduce the notification traffic in a high scalable upgrade system through the use of configurable filters, simultaneous notifications and consolidated notifications across multiple hosts. The tens of thousands of notifications (e.g., start/stop notifications) that were previously sent for a given upgrade process among the multiple upgrade processes of an overall upgrade operation are reduced to one notification per pod that includes information for multiple hosts. In addition, tens of thousands of conventional notifications may be automatically discarded based on user-defined preferences requesting to receive only a selected set of notifications. Thus, techniques discussed herein dramatically reduce the notifications-related traffic for that pod.

Figure 3:
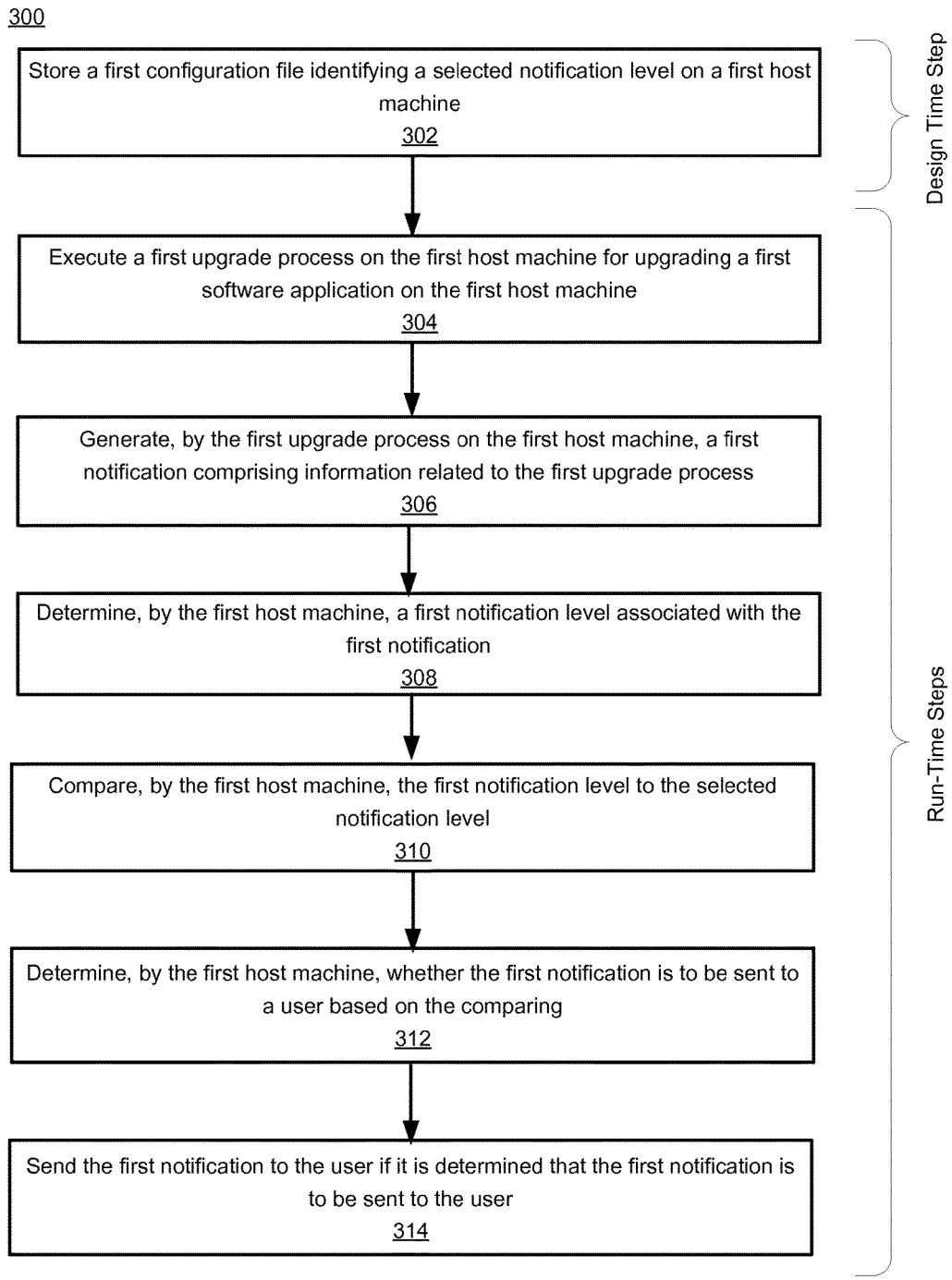
FIG. 3 depicts a simplified flowchart depicting processing performed by the upgrade infrastructure for filtering notifications by a host machine before sending the notifications to a user, according to an embodiment of the present invention.

FIG. 3 depicts a simplified flowchart 300 depicting processing performed by the upgrade infrastructure for selectively choosing notifications that are sent to a user from a host machine from among multiple notifications generated by upgrade processes executed by the host machine, according to an embodiment of the present invention. The processing depicted in FIG. 3 may be implemented in software (e.g., code, instructions, program) executed by one or more processing units (e.g., processors cores), in hardware, or using combinations thereof. The software may be stored on a non-transitory computer-readable medium (e.g., a memory device, a memory). The particular series of processing steps depicted in FIG. 3 is not intended to be limiting. In one embodiment, the processing depicted in FIG. 3 is performed by one or more components of the upgrade infrastructure 100 depicted in FIG. 1.

The processing in flowchart 300 comprises two phases: a design time phase and a runtime phase. The design time phase corresponds to before the upgrade operation is started. The runtime phase corresponds to when the overall upgrade operation has been initiated. The description below assumes that the host machines involved in the upgrade operation include a first host machine.

During the design time, at 302, information is stored on the first host machine identifying a user-specified level information. In certain embodiment, this information may be stored in a first configuration file stored on the first host machine. The first configuration file may identify a user-specified notification level that is then used by the first host machine to identify which notifications are to be sent to the user and which notifications are to be not sent to the user (i.e., filtered out). The user-specified notification level indicates a notification level that the user is interested in. In some embodiments, the user-specified level may be a hierarchical level.

In certain embodiments, the configuration file stored on a host machine may store user-specified level preferences for multiple users. The level preference specified by a first user may be different from a level preference specified by a second user, and so on. In this manner, level preferences for multiple users may be stored in the configuration file stored on a host machine and the host machine may then use this configuration information to determine which notifications to send to individual users and which notifications to filter out. For example, the first configuration file may store user-specified level preferences for one or more users in addition to the first user.

The processing depicted in 304, 306, 308, 310, 312, and 314 is performed during the runtime phase. At 304, as part of the overall upgrade operation, a first upgrade process may be executed on the first host machine for upgrading a first software application on the first host machine. At 306, the first upgrade process may generate a first notification during execution on the first host machine. The first notification may include information related to the first upgrade process such as the status of the upgrade process as of the time the first notification is generated. For example, the first notification may indicate that the first upgrade process has started execution, paused execution, about to finish execution, or that a failure occurred during the execution of the upgrade process, and the like.

At 308, the first host machine may determine a first notification level associated with the first notification generated in 306. For example, the first notification may include a flag or a field indicating the notification level associated with the first notification.

At 310, the first host machine may compare the first notification level to the user-specified notification level indicated in the configuration file. At 312, the first host machine may then determine whether the first notification is to be sent to a user based on the comparing performed in 310. At 314, the first host machine sends the first notification to the user if the first host machine determines in 312 that the first notification is to be sent to the user, else the notification is not sent to the user. The notification may be sent to the user in various different forms such as an electronic alert, an email messages, a text message, an SMS message, and the like.

Figure 7:
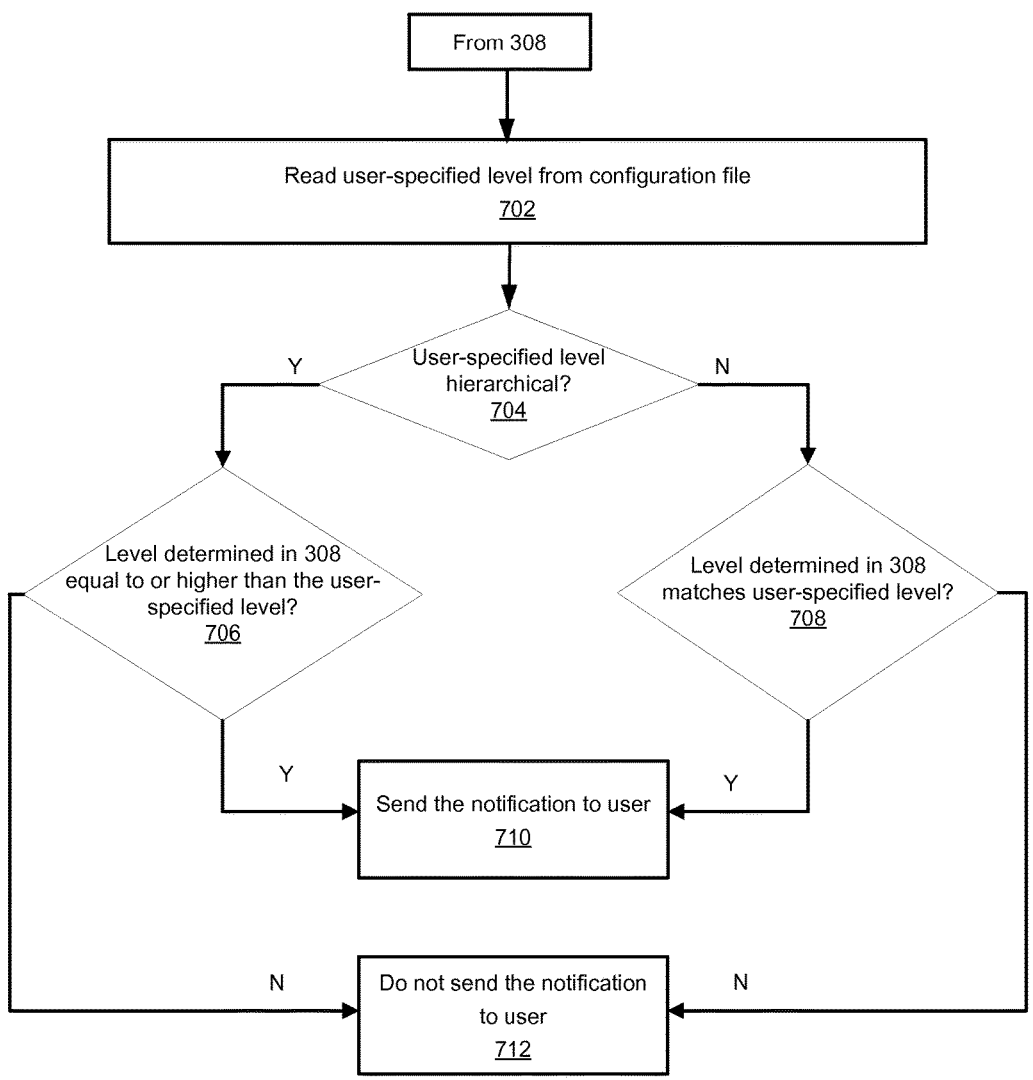
FIG. 7 depicts a simplified flowchart depicting a method performed by a host machine for determining whether a notification is to be sent to a user according to an embodiment of the present invention.

Different techniques may be used in 310, 312, and 314 to determine whether the first notification is to be sent to the user. One such technique is depicted in FIG. 7. FIG. 7 depicts a simplified flowchart 700 depicting a method performed by a host machine for determining whether a notification is to be sent to a user according to an embodiment of the present invention. The processing depicted in FIG. 7 may be implemented in software (e.g., code, instructions, program) executed by one or more processing units (e.g., processors cores) of the host machine, in hardware, or using combinations thereof. The software may be stored on a non-transitory computer-readable medium (e.g., a memory device, a memory). The particular series of processing steps depicted in FIG. 7 is not intended to be limiting.

The flowchart 700 starts after the first host machine determines a first notification level associated with the first notification generated in 306, at 308. For example, the first notification may include a flag or a field indicating the notification level associated with the first notification.

At 702, the first host machine reads a user-specified level from the configuration file. At 704, the first host machine determines whether the user-specified level is hierarchical. As provided above, two or more of the levels may be organized in a hierarchy or ordering (e.g. a severity or an importance hierarchy). For example, a hierarchy may be defined for the PAUSEPOINT, ALERT, and INFO levels discussed above such that PAUSEPOINT corresponds to a higher hierarchical level than the ALERT level, and the ALERT level corresponds to a higher hierarchical level than the INFO level. The hierarchical relationships between the levels may influence the notifications that are sent to the users.

If the first host machine determines that the user-specified level is hierarchical (e.g., YES to 704), then, at 706, the first host machine determines whether the level determined in 308 is equal or higher than the user-specified level.

If the first host machine determines that the level determined in 308 is equal or higher than the user-specified level (e.g., YES to 706), then the first host machine sends the notification to the user at 710.

If the first host machine determines that the level determined in 308 is not equal or higher than the user-specified level (e.g., NO to 706), then the first host machine does not send the notification to the user at 712.

On the other hand, returning back to 704, if the first host machine determines that the user-specified level is not hierarchical (e.g., NO to 704), then, at 708, the first host machine determines whether the level determined in 308 matches the user-specified level.

If the first host machine determines that the level determined in 308 matches the user-specified level (e.g., YES to 708), then the first host machine sends the notification to the user at 710.

If the first host machine determines that the level determined in 308 does not match the user-specified level (e.g., NO to 708), then the first host machine does not send the notification to the user at 712.

Figure 8A:
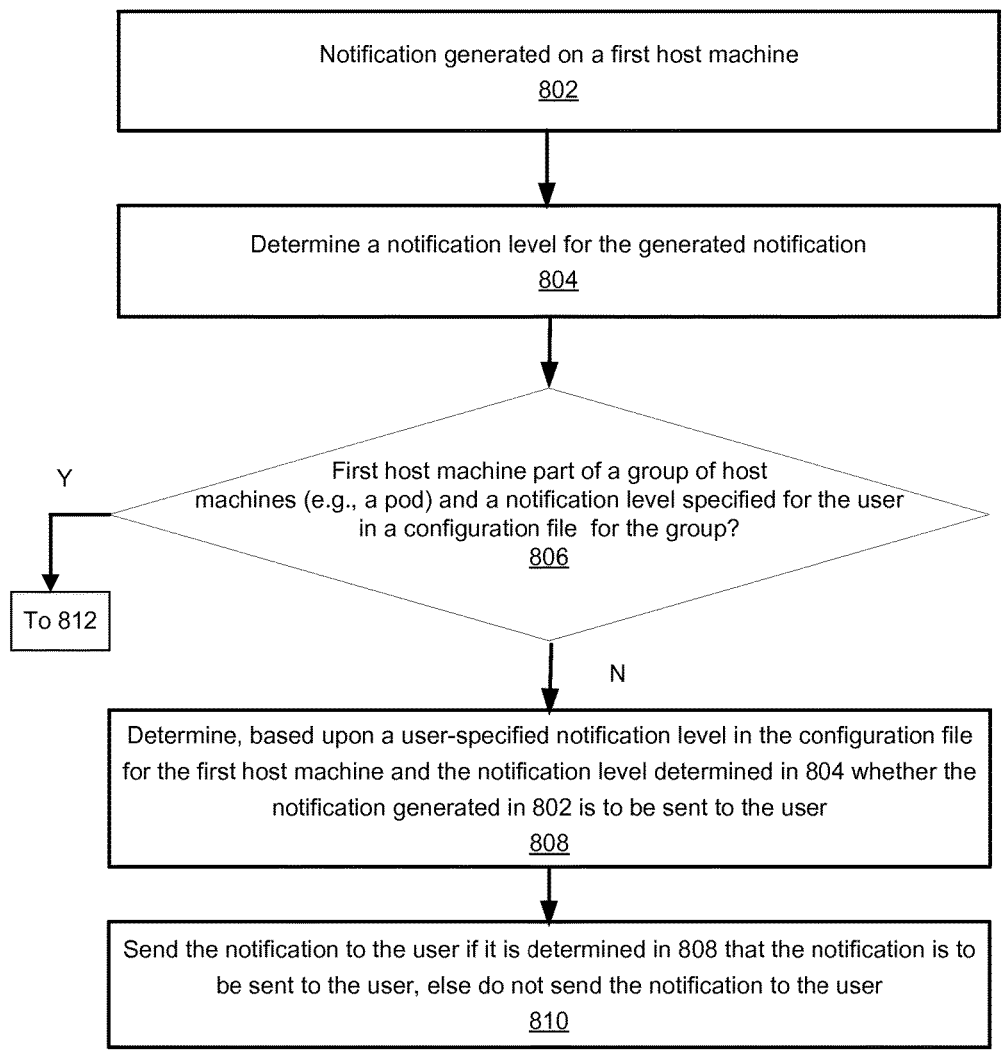
FIGS. 8A and 8B together depict a simplified flowchart for determining whether a notification generated by a host machine is to be sent to a user when the host machine is part of a group of host machines (e.g., a pod) according to an embodiment of the present invention.
Figure 8B:
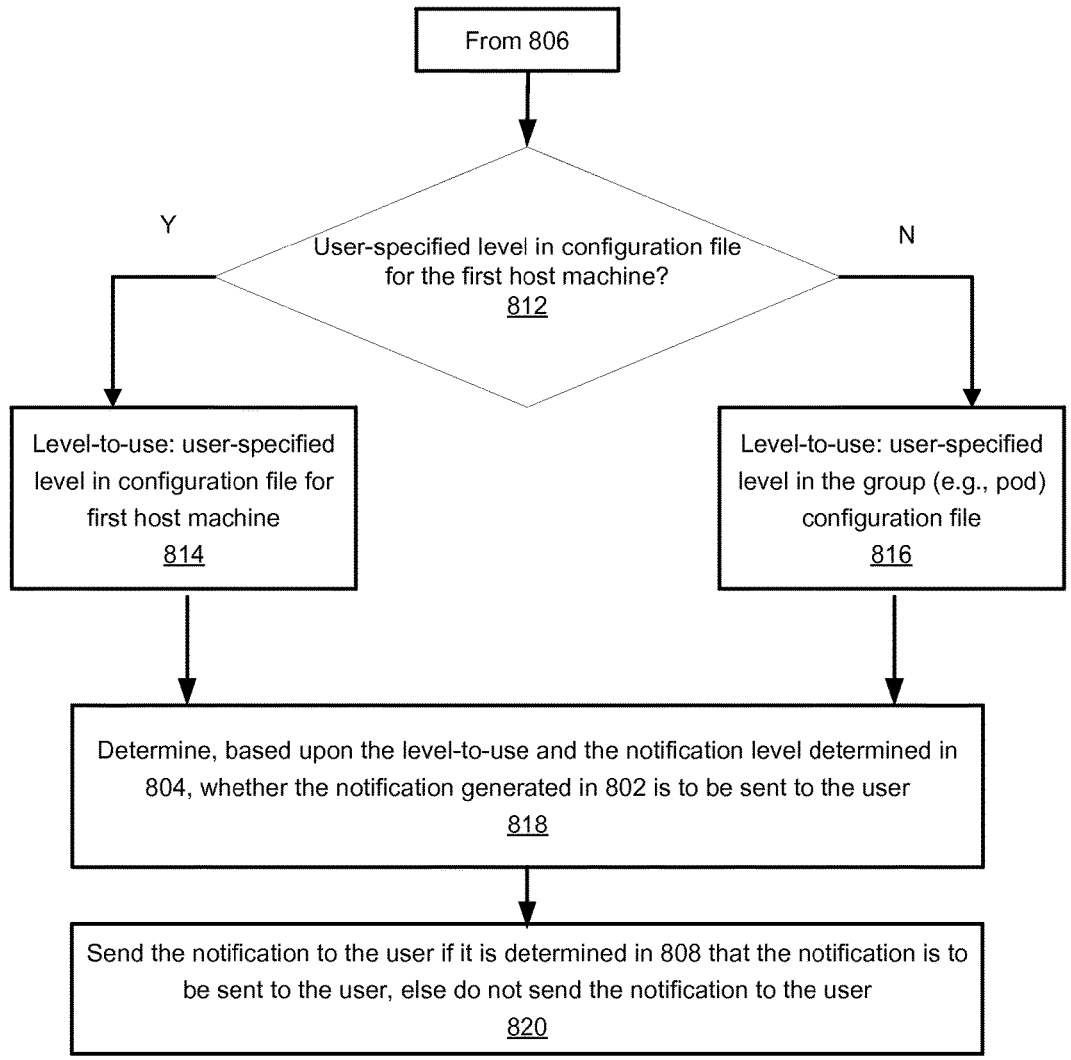

In some embodiments, the first host machine may be a part of a group of host machines (e.g., a pod) having a group configuration file identifying a user-specified group notification level. The group notification level may indicate a notification level that the user is interested in for all hosts within the group. FIGS. 8A and 8B together depict a simplified flowchart 800 for determining whether a notification generated by a host machine is to be sent to a user when the host machine is part of a group of host machines (e.g., a pod) according to an embodiment of the present invention. The processing depicted in FIGS. 8A and 8B may be implemented in software (e.g., code, instructions, program) executed by one or more processing units (e.g., processors cores) of a host machine, in hardware, or using combinations thereof. The software may be stored on a non-transitory computer-readable medium (e.g., a memory device, a memory). The particular series of processing steps depicted in FIGS. 8A and 8B is not intended to be limiting.

At 802, a notification is generated on a first host machine. At 804, the first host machine determines a notification level for the generated notification.

At 806, the first host machine determines whether the first host machine is part of a group of host machines (e.g., a pod) and a notification level specified for the user in a configuration file for the group.

If the first host machine determines that the first host machine is part of a group of host machines (e.g., a pod) and a notification level specified for the user in a configuration file for the group (YES to 806), then, at 808, the first host machine determines, based upon a user-specified notification level in the configuration file for the first host machine and the notification level determined in 804, whether the notification generated in 802 is to be sent to the user.

At 810, the first host machine sends the notification to the user if it is determined in 808 that the notification is to be sent to the user, else the first host machine does not send the notification to the user.

If the first host machine determines that the first host machine is not part of a group of host machines (e.g., a pod) and a notification level specified for the user in a configuration file for the group (NO to 806), then the processing moves to 812 in FIG. 8B. At 812, the first host machine determines whether there is a user-specified level in configuration file for the first host machine.

If there is a user-specified level in configuration file for the first host machine (YES to 812), then, at 814, the first host machine determines the level-to-use as the user-specified level in the configuration file.

If there is no user-specified level in configuration file for the first host machine (NO to 812), then, at 816, the first host machine determines the level-to-use as the user-specified level in the group (e.g., pod) configuration file.

At 818, the first host machine determines, based upon the level-to-use and the notification level determined in 804, whether the notification generated in 802 is to be sent to the user.

At 820, the first host machine sends the notification to the user if it is determined in 818 that the notification is to be sent to the user, else the first host machine does not send the notification to the user.

Figure 4:
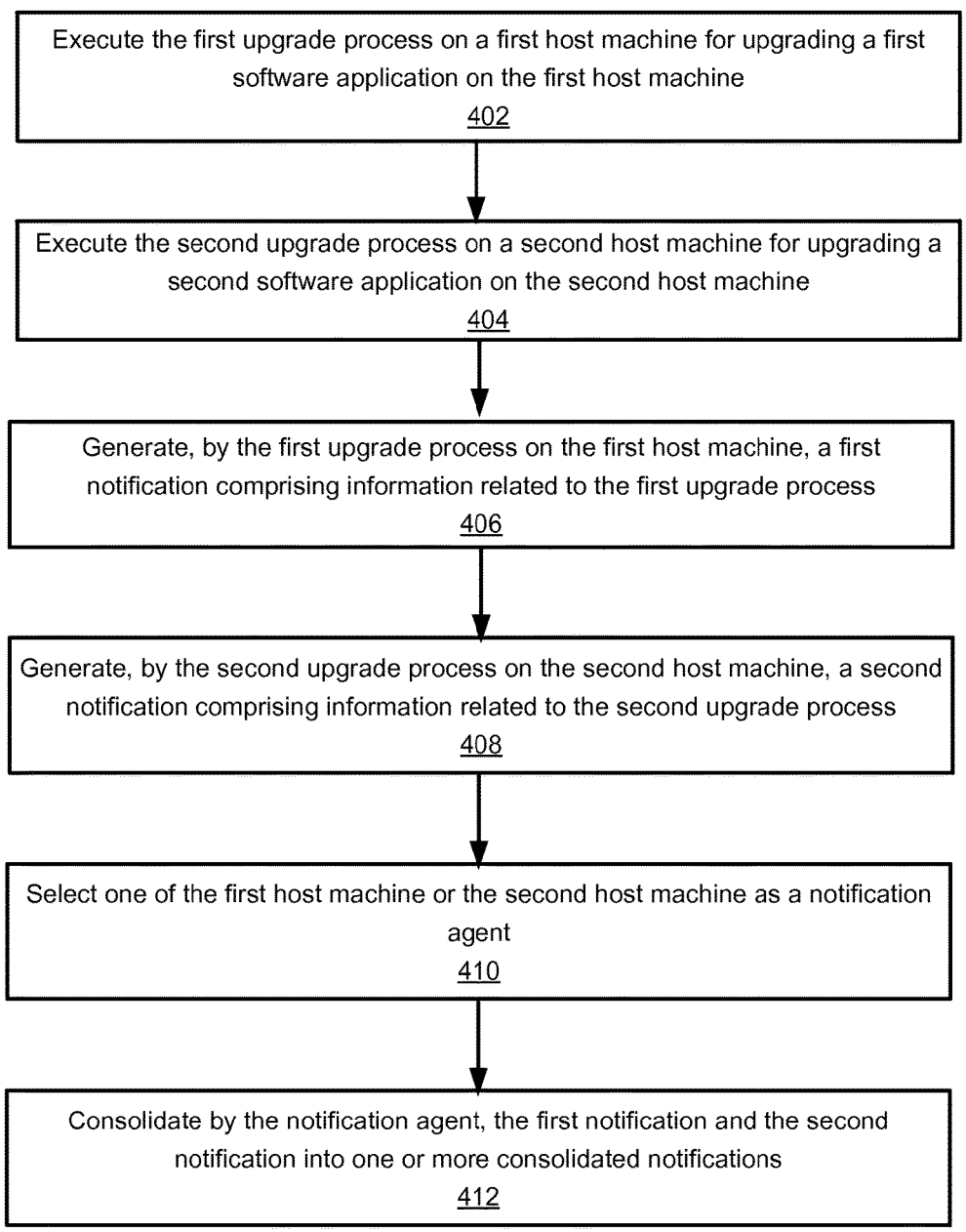
FIG. 4 depicts a simplified flowchart depicting processing performed by the upgrade infrastructure for consolidating notifications generated by multiple upgrade processes hosted by multiple host machines before sending the notifications to a user, according to an embodiment of the present invention.

As provided above, in certain embodiments, multiple notifications generated by one or more host machines may be consolidated into a few number of consolidated notifications. For example, multiple notifications generated by one or more upgrade processes executing on one or more host machines may be consolidated into a single consolidated notification and the consolidated notification then sent to a user instead of the multiple notifications. FIG. 4 illustrates a simplified flowchart 400 depicting processing performed for consolidating multiple notifications generated by one or more upgrade processes hosted by one or more host machines according to an embodiment of the present invention. The processing depicted in FIG. 4 may be implemented in software (e.g., code, instructions, program) executed by one or more processing units (e.g., processors cores), hardware, or combinations thereof. The software may be stored in memory (e.g., on a memory device, on a non-transitory computer-readable storage medium). The particular series of processing steps depicted in FIG. 4 is not intended to be limiting. In one embodiment, the processing depicted in FIG. 4 is performed by one or more components of the upgrade infrastructure 200 depicted in FIG. 2.

For the processing depicted in FIG. 4, it is assumed that a group of multiple host machines has been configured, the group including a first host machine and a second host machine. At 402, a first upgrade process is executed on the first host machine for upgrading a first software application on the first host machine. Similarly, at 404, a second upgrade process may be executed on the second host machine for upgrading a second software application on the second host machine. The first upgrade process and the second upgrade process may generate notifications at various time points during their execution. The notifications for each upgrade process may include information indicative of a status of that upgrade process when the notification is generated. For example, the notifications may indicate that the upgrade process has started execution, paused execution, is close to finishing execution, or that a failure happened during the execution of the upgrade process, and the like.

For example, at 406, the first upgrade process may generate a first notification comprising information related to the first upgrade process executing on the first host machine. The first notification may indicate an upgrade progress status of the first upgrade process. At 408, the second upgrade process may generate a second notification comprising information related to the second upgrade process executing on the second host machine. The second notification may indicate an upgrade progress status of the second upgrade process.

Since the first and second host machines are part of a group of host machines (e.g., a pod), at 410, the first notification generated by the first host machine and the second notification generated by the second host machine are sent to a host machine within the group that is acting as the notification agent for that group of host machines. In some embodiments, the selection of a particular host machine within the group as the notification agent may be done statically, for example, configured prior to the initiation of the upgrade operation. In such an embodiment, the notification agent for the group of host machines remains the same and does not change. In some other embodiments, the selection of a particular host machine within the group as the notification agent may be done dynamically and may change during the upgrade operation. In a dynamic embodiment, as part of 410, a determination may first be made as to which host machine within the group of host machines is the notification agent and the first and second notifications are then sent to that notification agent host machine. It is possible that one of the first host machine or the second host machine acts as the notification agent. [You will need to make changes to FIG. 4 based upon the changes made here.]

In some embodiments, a dedicated host machine, possibly even outside the group of host machines, may be designated as the dedicated notification agent as part of the upgrade infrastructure. The notifications are then sent to that notification agent.

At 412, the notification agent consolidates the first notification and the second notification into a single consolidated notification. At 414, the consolidated notification is then sent to the user instead of the first and second notifications. The consolidated notification may be sent to the user in various different forms such as an electronic alert, an email messages, a text message, an SMS message, and the like.

While consolidation of only two notifications is depicted in FIG. 4 and described above, this is not meant to be restrictive. In general, multiple notifications may be consolidated in a fewer number of consolidated notifications, where the number of consolidated notifications is lesser than the number of generated notifications. The multiple notifications may be generated by the same upgrade process, by multiple upgrade processes on the same host, or multiple upgrade processes on multiple hosts. The multiple notifications may be consolidated into a fewer number of consolidated notifications or even into a single consolidate notification.

For example, according to one technique, information from the multiple notifications may be collected and aggregated into the consolidated notification. In another technique, the notification agent may generate information to be included in the consolidated notification based upon the information contained in the multiple notifications to be consolidated. For example, in one embodiment, the notification agent may generate summary information based the information contained in the individual notifications to be consolidated and the summary information may be included in the consolidate notification that is generated and sent to the user.

In certain embodiments, the filtering of notifications based upon user-specified levels and the consolidation of notifications may be performed together by the notification agent. In certain embodiments, for a notification generated by a host machine, the host machine may be configured to first determine whether the notification is to be sent to the notification agent based upon the notification level associated with the generated notification and the user-specified level stored in the configuration file for the host machine. The host machine may only the send the notification to the notification agent if the notification level associated with the notification matches the user-specified notification level, or in the case of hierarchical levels, matches or is higher than the user-specified notification level. In this manner, the notification agent receives only a subset, and not all, of the notifications generated by the host machines. The notification agent may then form consolidated notifications based upon the received notifications. For example, for the scenarios depicted in FIG. 4 and described above, the user may define a first configuration file for the first host machine and/or a second configuration file for the second host machine. The first host machine may decide whether or not to send the first notification to the notification agent based on the first configuration file. The second host machine may decide whether or not to send the second notification to the notification agent based on the second configuration file. Accordingly, the first configuration file and the second configuration file may be applied to the first notification and the second notification, respectively, prior to the notification agent receiving the notifications.

In some other embodiments, the notification agent may be configured to filter the received notifications based upon a user-specified notification level in the group-level configuration file (e.g., the pod-level configuration file). Accordingly, from the multiple notifications received by the notification agent, the notification agent may filter out some notifications based upon the group-level configuration information. The notifications that are not filtered out may then be consolidated by the notification agent and the consolidated notifications then sent out to the user.

In yet another embodiment, notification levels may also be associated with the consolidate notifications and the notification agent may determine whether or not to send a consolidated notification to the user based upon the level associated with the consolidated notification and the user-specified level in the group-level configuration file for that groups of host machines. The notification agent may then only send out consolidated notifications that pass the group-level based notification level filter to the user.

As described above, embodiments provide various techniques for reducing the number of notifications that are communicated to users from multiple hosts involved in an upgrade operation. These techniques include filtering out notifications at the host machines based upon user-specified level criteria, generating consolidated notifications, and combinations thereof. As a result, the number of notifications that are actually sent to a user is far less than the number of notifications that are generated by the multiple upgrade processes executing on the multiple host machines. As a result, compared to conventional techniques, the number of network, processing, and memory resources needed for processing of the notifications, both on the host machines side and also on the client devices of users that receive the notifications, are dramatically reduced.

Figure 5:
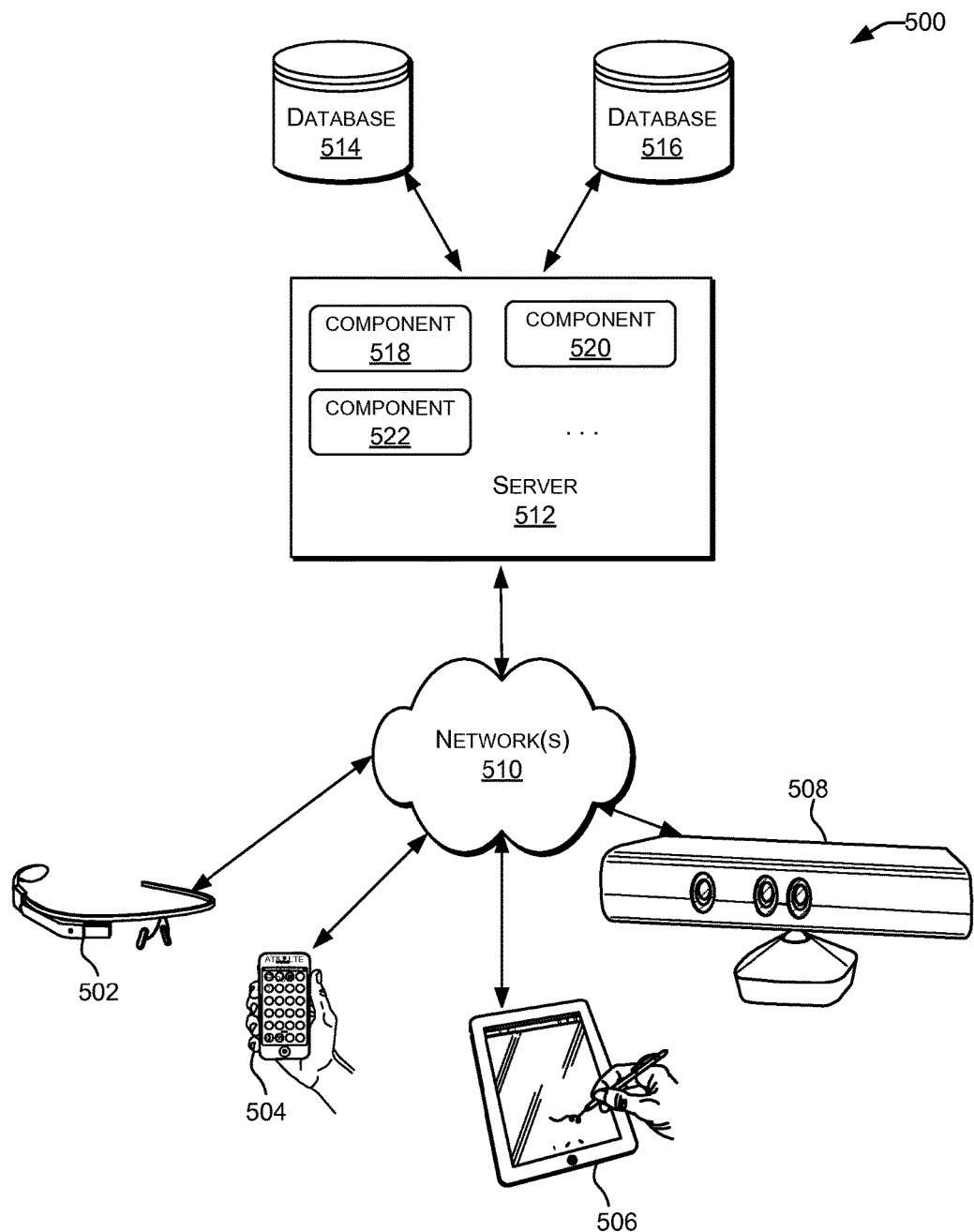
FIG. 5 depicts a simplified diagram of a distributed system for implementing one of the embodiments.

FIG. 5 depicts a simplified diagram of a distributed system 500 for implementing one of the embodiments. In the illustrated embodiment, distributed system 500 includes one or more client computing devices 502, 504, 506, and 508, which are configured to execute and operate a client application such as a web browser, proprietary client (e.g., Oracle Forms), or the like over one or more network(s) 510. Server 512 may be communicatively coupled with remote client computing devices 502, 504, 506, and 508 via network 510.

In various embodiments, server 512 may be adapted to run one or more services or software applications provided by one or more of the components of the system. In some embodiments, these services may be offered as web-based or cloud services or under Software as a Service (SaaS) model to the users of client computing devices 502, 504, 506, and/or 508. Users operating client computing devices 502, 504, 506, and/or 508 may in turn utilize one or more client applications to interact with server 512 to utilize the services provided by these components.

In the configuration depicted in the figure, the software components 518, 520 and 522 of system 500 are shown as being implemented on server 512. In other embodiments, one or more of the components of system 500 and/or the services provided by these components may also be implemented by one or more of the client computing devices 502, 504, 506, and/or 508. Users operating the client computing devices may then utilize one or more client applications to use the services provided by these components. These components may be implemented in hardware, firmware, software, or combinations thereof. It should be appreciated that various different system configurations are possible, which may be different from distributed system 500. The embodiment shown in the figure is thus one example of a distributed system for implementing an embodiment system and is not intended to be limiting.

Client computing devices 502, 504, 506, and/or 508 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 502, 504, 506, and 508 may be any other electronic device, such as a thin-client computer, an Internet-enabled gaming system (e.g., a Microsoft Xbox gaming console with or without a Kinect® gesture input device), and/or a personal messaging device, capable of communicating over network(s) 510.

Although exemplary distributed system 500 is shown with four client computing devices, any number of client computing devices may be supported. Other devices, such as devices with sensors, etc., may interact with server 512.

Network(s) 510 in distributed system 500 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 510 can be a local area network (LAN), such as one based on Ethernet, Token-Ring and/or the like. Network(s) 510 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Server 512 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, server 512 may be adapted to run one or more services or software applications described in the foregoing disclosure. For example, server 512 may correspond to a server for performing processing described above according to an embodiment of the present disclosure.

Server 512 may run an operating system including any of those discussed above, as well as any commercially available server operating system. Server 512 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 512 may include one or more applications to analyze and consolidate data feeds and/or event updates received from users of client computing devices 502, 504, 506, and 508. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 512 may also include one or more applications to display the data feeds and/or real-time events via one or more display devices of client computing devices 502, 504, 506, and 508.

Distributed system 500 may also include one or more databases 514 and 516. Databases 514 and 516 may reside in a variety of locations. By way of example, one or more of databases 514 and 516 may reside on a non-transitory storage medium local to (and/or resident in) server 512. Alternatively, databases 514 and 516 may be remote from server 512 and in communication with server 512 via a network-based or dedicated connection. In one set of embodiments, databases 514 and 516 may reside in a storage-area network (SAN). Similarly, any necessary files for performing the functions attributed to server 512 may be stored locally on server 512 and/or remotely, as appropriate. In one set of embodiments, databases 514 and 516 may include relational databases, such as databases provided by Oracle, that are adapted to store, update, and retrieve data in response to SQL-formatted commands.

Figure 6:
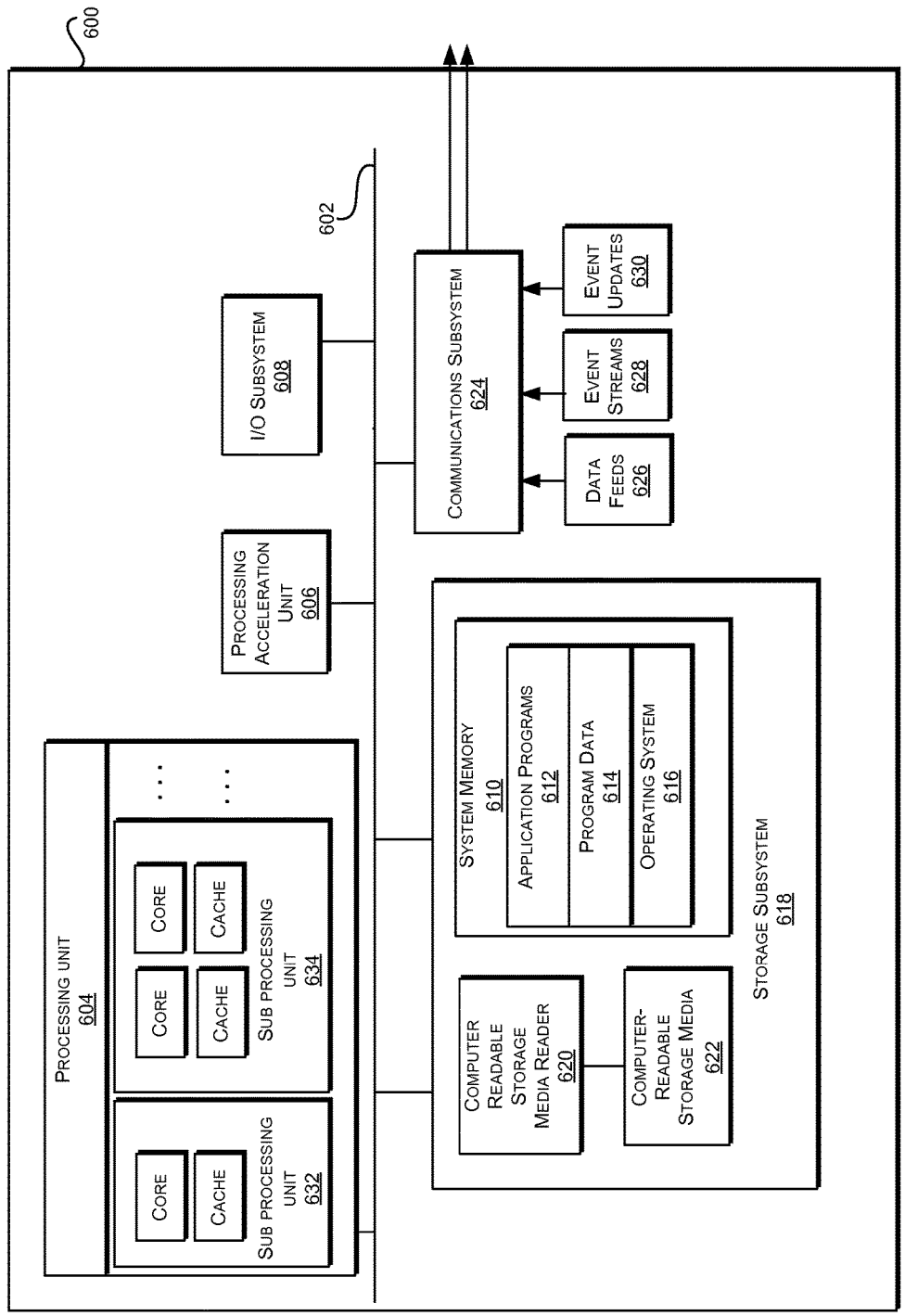
FIG. 6 depicts an exemplary computer system that may be used to implement an embodiment of the present invention.

FIG. 6 illustrates an exemplary computer system 600, in which various embodiments of the present invention may be implemented. The system 600 may be used to implement any of the computer systems described above. As shown in the figure, computer system 600 includes a processing unit 604 that communicates with a number of peripheral subsystems via a bus subsystem 602. These peripheral subsystems may include a processing acceleration unit 606, an I/O subsystem 608, a storage subsystem 618 and a communications subsystem 624. Storage subsystem 618 includes tangible computer-readable storage media 622 and a system memory 610.

Bus subsystem 602 provides a mechanism for letting the various components and subsystems of computer system 600 communicate with each other as intended. Although bus subsystem 602 is shown schematically as a single bus, alternative embodiments of the bus subsystem may utilize multiple buses. Bus subsystem 602 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 604, which can be implemented as one or more integrated circuits (e.g., a conventional microprocessor or microcontroller), controls the operation of computer system 600. One or more processors may be included in processing unit 604. These processors may include single core or multicore processors. In certain embodiments, processing unit 604 may be implemented as one or more independent processing units 632 and/or 634 with single or multicore processors included in each processing unit. In other embodiments, processing unit 604 may also be implemented as a quad-core processing unit formed by integrating two dual-core processors into a single chip.

In various embodiments, processing unit 604 can execute a variety of programs in response to program code and can maintain multiple concurrently executing programs or processes. At any given time, some or all of the program code to be executed can be resident in processor(s) 604 and/or in storage subsystem 618. Through suitable programming, processor(s) 604 can provide various functionalities described above. Computer system 600 may additionally include a processing acceleration unit 606, which can include a digital signal processor (DSP), a special-purpose processor, and/or the like.

I/O subsystem 608 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 600 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 600 may comprise a storage subsystem 618 that comprises software elements, shown as being currently located within a system memory 610. System memory 610 may store program instructions that are loadable and executable on processing unit 604, as well as data generated during the execution of these programs.

Depending on the configuration and type of computer system 600, system memory 610 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 604. In some implementations, system memory 610 may include multiple different types of memory, such as static random access memory (SRAM) or dynamic random access memory (DRAM). In some implementations, a basic input/output system (BIOS), containing the basic routines that help to transfer information between elements within computer system 600, such as during start-up, may typically be stored in the ROM. By way of example, and not limitation, system memory 610 also illustrates application programs 612, which may include client applications, Web browsers, mid-tier applications, relational database management systems (RDBMS), etc., program data 614, and an operating system 616. By way of example, operating system 616 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 618 may also provide a tangible computer-readable storage medium for storing the basic programming and data constructs that provide the functionality of some embodiments. Software (programs, code modules, instructions) that when executed by a processor provide the functionality described above may be stored in storage subsystem 618. These software modules or instructions may be executed by processing unit 604. Storage subsystem 618 may also provide a repository for storing data used in accordance with the present invention.

Storage subsystem 600 may also include a computer-readable storage media reader 620 that can further be connected to computer-readable storage media 622. Together and, optionally, in combination with system memory 610, computer-readable storage media 622 may comprehensively represent remote, local, fixed, and/or removable storage devices plus storage media for temporarily and/or more permanently containing, storing, transmitting, and retrieving computer-readable information.

Computer-readable storage media 622 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 600.

By way of example, computer-readable storage media 622 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 622 may include, but is not limited to, Zip® drives, flash memory cards, universal serial bus (USB) flash drives, secure digital (SD) cards, DVD disks, digital video tape, and the like. Computer-readable storage media 622 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 600.

Communications subsystem 624 provides an interface to other computer systems and networks. Communications subsystem 624 serves as an interface for receiving data from and transmitting data to other systems from computer system 600. For example, communications subsystem 624 may enable computer system 600 to connect to one or more devices via the Internet. In some embodiments communications subsystem 624 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 624 can provide wired network connectivity (e.g., Ethernet) in addition to or instead of a wireless interface.

In some embodiments, communications subsystem 624 may also receive input communication in the form of structured and/or unstructured data feeds 626, event streams 628, event updates 630, and the like on behalf of one or more users who may use computer system 600.

By way of example, communications subsystem 624 may be configured to receive data feeds 626 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 624 may also be configured to receive data in the form of continuous data streams, which may include event streams 628 of real-time events and/or event updates 630, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 624 may also be configured to output the structured and/or unstructured data feeds 626, event streams 628, event updates 630, and the like to one or more databases that may be in communication with one or more streaming data source computers coupled to computer system 600.

Computer system 600 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 600 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method comprising:
    generating, by a first upgrade process executing on a first host machine, a first notification, wherein the first upgrade process is for upgrading a first software application on the first host machine, and wherein the first notification includes information related to the first upgrade process;
    determining, by the first host machine, a first notification level for the first notification;
    determining, by the first host machine, a first preference level specified by a user, wherein the first preference level is specified for the first host machine, wherein a second upgrade process executing on a second host machine generates a second notification, wherein the second upgrade process is for upgrading a second software application on the second host machine, wherein the second notification includes information related to the second upgrade process, and wherein a second preference level specified by the user for the second host machine is different than the first preference level specified for the first host machine;

comparing, by the first host machine, the first notification level to the first preference level to determine whether to send the first notification to the user from the first host machine;

sending, by the first host machine, the first notification to the user from the first host machine only upon determining that the first notification level is the same as or higher than the first preference level; and not sending, by the first host machine, the first notification to the user from the first host machine upon determining that the first notification level is lower than the first preference level.

2. The method of claim 1, further comprising:
storing, by the first host machine, a configuration file, the configuration file storing the first preference level specified for the first host machine.

3. The method of claim 2, wherein the configuration file includes preference levels specified for the first host machine by multiple users, the multiple users including the user.

4. The method of claim 1, wherein the first notification comprises information indicating an upgrade progress status of the first upgrade process.

5. The method of claim 1, wherein the first notification is sent to a notification agent to be consolidated with additional notifications prior to being sent to the user.

6. The method of claim 1, wherein the first preference level is host-machine specific for the first host machine.

7. A method comprising:
generating, by a first upgrade process executing on a first host machine, a first notification comprising information related to the first upgrade process, wherein the first upgrade process is for upgrading a first software application on the first host machine, and wherein the first host machine is part of a first group of host machines;

determining, by the first host machine, a first notification level for the first notification;

storing, by the first host machine, a group configuration file, the group configuration file storing a first group preference level specified by a user, wherein the first group preference level is specified for the first group of host machines, wherein a second group preference level specified by the user for a second group of host machines is different than the first group preference level specified for the first group of host machines;

comparing, by the first host machine, the first notification level to the first group preference level to determine whether to send the first notification to the user from the first host machine; and sending, by the first host machine, the first notification to the user from the first host machine only upon determining, based upon the comparing, that the notification is to be sent from the first host machine; and not sending, by the first host machine, the first notification to the user from the first host machine upon determining, based upon the comparing, that the first notification is to not be sent from the first host machine.

8. The method of claim 7, further comprising:
storing, by the first host machine, a configuration file, the configuration file storing a first preference level specified for the first host machine, wherein the first preference level specified for the first host machine indicates when to send a notification to the user from the first host machine, and wherein not sending the first notification to the user is further based on the first preference level specified for the first host machine.

9. The method of claim 8, wherein the first group preference level trumps the first preference level specified for the first host machine when determining to not send the first notification to the user.

10. The method of claim 8, wherein the first preference level specified for the first host machine trumps the first group preference level when determining to not send the first notification to the user.

11. The method of claim 7, wherein the first notification is sent to the user from the first host machine only upon determining that the first notification level is the same as or higher than the first group preference level, and wherein the first notification is not sent to the user upon determining that the first notification level is lower than the first group preference level.

12. The method of claim 7, wherein the first notification comprises information indicating an upgrade progress status of the first upgrade process.

13. The method of claim 7, wherein the first notification is sent to a notification agent to be consolidated with additional notifications prior to being sent to the user.

\* \* \* \* \*

UNITED STATES PATENT AND TRADEMARK OFFICE
CERTIFICATE OF CORRECTION

PATENT NO. : 9,880,828 B2
APPLICATION NO. : 14/935254
DATED : January 30, 2018
INVENTOR(S) : Hu et al.

Page 1 of 1

It is certified that error appears in the above-identified patent and that said Letters Patent is hereby corrected as shown below:

On page 2, Column 2, under Other Publications, Line 15-16, delete "Monitor Monitor," and insert -- Monitor, --, therefor.

Signed and Sealed this
Twenty-first Day of August, 2018

Andrei Iancu
*Director of the United States Patent and Trademark Office*